United States Patent [19]

Wermeister

[11] Patent Number: 4,487,533
[45] Date of Patent: Dec. 11, 1984

[54] MOUNT FOR MILLING TOOL BITS

[75] Inventor: Günter Wermeister, Ratingen, Fed. Rep. of Germany

[73] Assignee: Santrade Ltd., Lucerne, Switzerland

[21] Appl. No.: 329,063

[22] Filed: Dec. 9, 1981

[30] Foreign Application Priority Data

Dec. 17, 1980 [DE] Fed. Rep. of Germany ....... 3047459

[51] Int. Cl.³ .............................................. B23B 27/16
[52] U.S. Cl. .................................................. 407/105
[58] Field of Search ................ 407/48, 103, 104, 105, 407/106, 93

[56] References Cited

U.S. PATENT DOCUMENTS

| | | | |
|---|---|---|---|
| 3,264,711 | 8/1966 | Jehring | 407/104 |
| 3,320,654 | 5/1967 | Lovendahl . | |
| 3,648,341 | 3/1972 | Viellet | 407/104 |
| 3,670,380 | 6/1972 | Moore et al. . | |
| 3,708,843 | 1/1973 | Erkfritz | 407/104 |
| 3,925,868 | 12/1975 | Singh | 407/104 |
| 4,083,645 | 4/1978 | Friedline | 407/104 |
| 4,245,937 | 1/1981 | Erickson | 407/105 |

FOREIGN PATENT DOCUMENTS 566678 7/1977 U.S.S.R. ............................. 407/105

*Primary Examiner*—Leonidas Vlachos
*Assistant Examiner*—Jerry Kearns
*Attorney, Agent, or Firm*—Burns, Doane, Swecker & Mathis

[57] ABSTRACT

A mount for the mounting of milling tool bits in a recess of a tool bit holder. A screw extends through a bore of the bit and screws into a threaded hole of the holder. A longitudinally slit sleeve is arranged between the screw and the inner wall of the bore of the bit and encompasses the screw. The end of the sleeve opposite the head of the screw rests upon a shoulder of the holder in such manner that when the screw is tightened the screw forces the sleeve into rotation about a rotary axis defined by the point(s) of contact of the sleeve with the shoulder. This rotary axis extends transverse to the screw axis such that an upper end of the sleeve is forced into engagement with the inner wall of the bit bore to secure the bit radially and axially. Replacement or indexing of the bit is permitted in response to minimal unscrewing of the screw, e.g., 90° to 180°.

10 Claims, 10 Drawing Figures

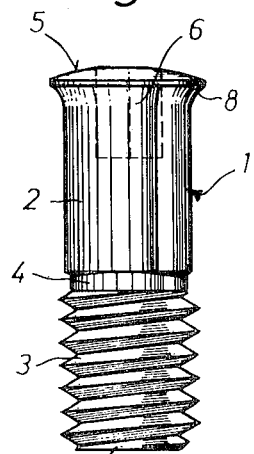
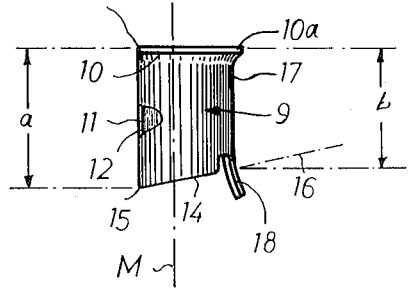
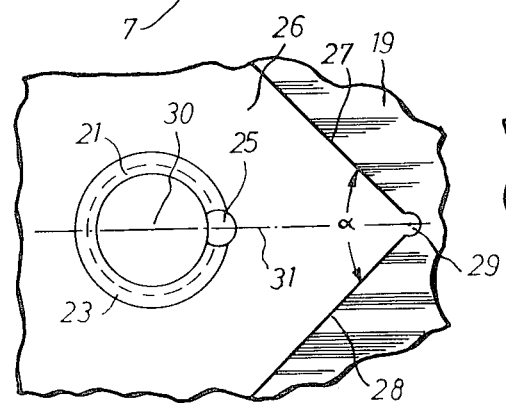
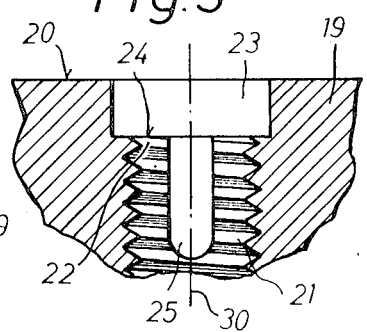
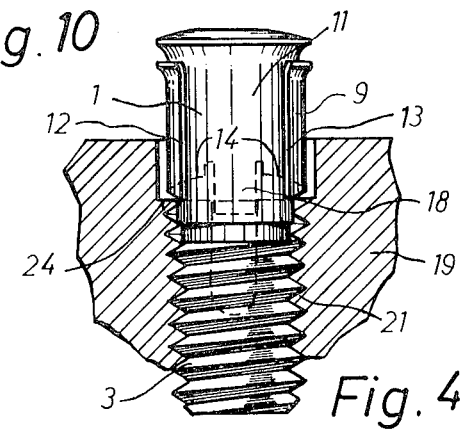
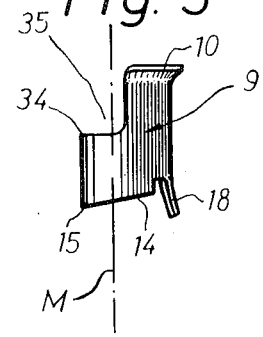

MOUNT FOR MILLING TOOL BITS

BACKGROUND AND OBJECTS OF THE INVENTION

The invention concerns a mount for mounting tool bits in a recess of a tool bit holder.

A tool bit mount is known from U.S. Pat. No. 3,670,380, wherein the tool bit is held by the conical head of a lockscrew without resting against the bounding walls of a recess of the tool bit holder. The lockscrew abuts against the annular outer edge of a bore of the tool bit. Since the tool itself is not supported by the bounding walls of a recess of the tool bit holder, a longitudinally slit sleeve encompasses the lockscrew and is equipped with a rectangular external circumference. The sleeve serves to position and immobilize the tool bit, i.e., to prevent the rotation of the tool bit. The sleeve extends into a rectangular cross-section recess of the tool bit and into a corresponding, coaxially rectangular recess of the tool bit holder. However, the sleeve does not provide in this known tool bit mounting a radial fixation of the tool. Rather, as explained hereinabove, the fixation of the tool bit in the tool bit holder is attained by the axial tightening of the lockscrew. For the purpose of replacing a tool bit or to rotate a reversible bit, the lockscrew must be screwed out completely from the threading of the tool bit holder.

A tool bit mount is disclosed in U.S. Pat. No. 3,320,654. The bit rests in a recess of the tool holder. A screw extends through a bore in the bit and screws into a hole of the tool holder. A longitudinally slit sleeve is arranged between the screw and the inner wall of the bore. And end of the sleeve remote from the head of the screw rests on a shoulder of the tool bit holder. The head of the screw protruding from the hole of the tool holder has a conical configuration. The inner wall of the longitudinally slit sleeve has a corresponding conical shape. The radial locking action of this known tool bit mount is based on the fact that when the tool bit rests against the bounding walls of the recess of the tool bit holder, the longitudinal axis of the threaded hole of the tool bit holder is eccentric with respect to the conical bore of the tool bit. The radial fixation of the tool bit against the walls of the recess of the tool bit holder is effected by the wedging action of the conical section of the lockscrew and the conical inner area of the longitudinally slit sleeve.

This tool bit mount achieves merely a radial locking effect; the means used for this purpose are expensive, as the lockscrew must have a conical configuration of a special shape and the sleeve itself must have a conical inner part corresponding to the conical area of the lockscrew. The conical configuration of the locking area of the lockscrew acts to weaken the latter in the radial direction. Rotation or removal of the bit cannot be performed until the screw is unscrewed sufficiently to enable the eccentricity between the bit bore and the holder hole to be eliminated.

It is an object of the invention to provide a tool bit mount of the above-described type wherein the bit is securely fixed during cutting, and the installation, removal and/or the rotation of the tool bit (or reversible bit) may be effected without a substantial screwing-out of the screw. Rather, there is to be required by the invention, merely a slight rotation by 90° to 180° of the screw.

A further object of the invention is to obtain a radial locking action of the lockscrew as well as an axial locking effect, which is particularly advantageous, when the tool bit or the reversible bit has a simple or double conical configuration in its central bore.

In addition, it is an object to enable commercially available standard parts or readily produced parts to be employed. This is especially true for the lock screw and the longitudinally slit sleeve.

Any weakening of the above-mentioned parts by special configurations is to be avoided by the present invention. Furthermore, while satisfying the above-cited conditions, an accurately oriented radial stress is to be achieved against the walls of the recess receiving the tool bit. In the bit according to U.S. Pat. No. 3,320,654, which defines a generic type of the mount according to the invention, the rotation of the sleeve around the axis of the lockscrew during tightening cannot be avoided, so that there is a danger that the locking action in the area of the longitudinal slit of the sleeve is effected in a non-uniform manner against the walls of the recess of the toll holder, thereby bending the slit outwardly. Such non-uniform and unsymmetrical radial stresses are to be avoided in keeping with the object of the invention. Furthermore, an accurate linear contact is to be established between the sleeve and the inner wall of the bore in the tool bit of the present invention.

SUMMARY OF THE INVENTION

These objects are achieved in accordance with the present invention which relates to a mount for the mounting of a milling tool bit in a recess of a bit holder. The bit has a bore therethrough and the mount includes a screw sized to extend through the bore of the bit and screw into a threaded hole of the tool bit holder. A longitudinally split sleeve arranged between the screw and an inner wall of the bore of the tool bit and encompasses the screw. An end of the sleeve disposed remotely of a head end of the screw includes an abutment portion resting on a shoulder of the tool bit holder. The abutment portion defines a rotary axis for the sleeve extending transversely of the sleeve axis and about which the sleeve is rotated in response to tightening of the screw. As the sleeve rotates about the rotary axis, a portion of the sleeve spaced from the rotary axis is displaced into firm engagement with the inner wall of the bore of the bit.

Preferably, the shoulder is disposed parallel to the tool bit, and a lower edge of the sleeve extends from terminal ends of edges which define the split. This lower edge is inclined relative to the shoulder to permit the rotation of the sleeve about its rotary axis.

An annular upper edge of the sleeve is preferably flared outwardly and is contacted by a complementarily configured portion of the screw, the latter displacing the sleeve about its rotary axis.

Preferably, the sleeve includes a projection which fits into a groove in the slot to prevent rotation of the sleeve when the screw is tightened.

The bore of the tool bit is preferably of conical configuration, and preferably of a double conical configuration in cases where the tool bit is reversible.

THE DRAWING

In the drawing, an example of embodiment of the tool bit mount of the invention is represented, wherein:

FIG. 1 shows the lockscrew used;

FIG. 2 shows one preferred embodiment of a longitudinally slit sleeve;

FIG. 3 depicts a partial longitudinal section through the tool bit holder and the threaded hole receiving the lockscrew showing how the hole widens to form a shoulder;

FIG. 4 is a longitudinal sectional view of the lockscrew and sleeve on the tool bit holder as viewed toward the longitudinal slit of the sleeve;

FIG. 5 depicts another preferred embodiment of the sleeve;

FIG. 10 is a top view of the tool bit holder recess with its lateral bounding walls and a top view of the hole of the tool bit holder.

DETAILED DESCRIPTION OF PREFERRED EMBODIMENTS OF THE INVENTION

Figure 6:
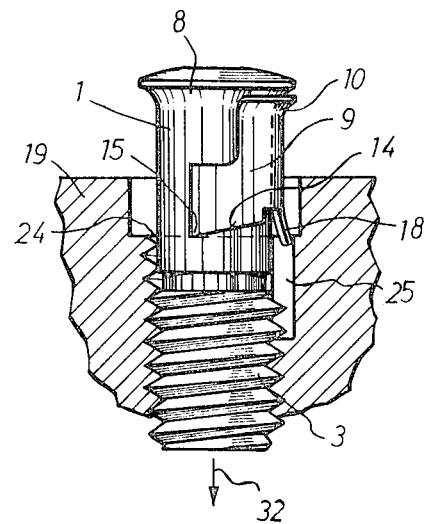
FIGS. 6 to 8 are longitudinal sectional views through the sleeve viewing the latter from a direction turned 90° relative to FIG. 4, depicting the position of the screw and sleeve at the beginning (FIG. 6), intermediate (FIG. 7), and final stages of locking of the bit (FIG. 8)

A lockscrew according to the invention includes an upper cylindrical shank portion 2 and a lower threaded portion 3 separated by a short cylindrical recessed area 4. From the chambered top side 5 of the shank, a polygonal internal recess 6 extends toward the foot 7 of the screw, so that the screw may be rotated by a polygonally shaped tool inserted into the recess 6. The cambered top side of the screw is followed by a contact surface in the form of a short, reversely angled conical section 8, the length whereof amounts to only a fraction of the cylindrical shank 2. The ratio of the length of the cylindrical shank to the length of the conical section 8 is preferably at least 5:1.

Two forms of a sleeve represented in FIGS. 2 and 5 differ only slightly, and therefore are discussed in conjunction with each other. The only difference is that in the sleeve of FIG. 5, an indentation 35 is provided. The sleeve 9 comprises a thin-walled spring material, e.g., spring steel, and includes at its upper end a flared rim 10. The inclination of the rim 10 (relative to the longitudinal axis of the sleeve) corresponds to the inclination of the conical section 8 of the screw 1. On one side, the sleeve 9 has a longitudinal slit 11, defined by two longitudinal edges 12, 13. Due to the slit 11, the circumference of the sleeve 9, in the relaxed state, extends over an angular range of between 200° and 330°. The sleeve is applied to the screw so that it tightly surrounds the shank 2 and may be inserted preferably from the bottom over the threads 3 and onto the shank. The ends of the edges 12, 13 located remotely of the head of the screw terminate in two corners 15.

Figure 9:
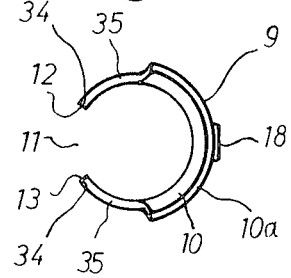
FIG. 9 is a plan view of the sleeve depicted in FIG. 5.

A lower edge 14 of the sleeve 9 extends from the two corners 15 in a spatial curve, which is non-perpendicular to the sleeve axis so that in the embodiment according to FIG. 2 the length of the edges 12, 13, i.e., the distance a of the upper end edge 10 from the projected extension 16 of the lower edge end 14, is larger than the length of the side 17 of the sleeve opposite the slit. This inclined configuration of the lower edge 14 relative to the shoulder 24 is of importance for the function of the sleeve to be explained hereinbelow and may also be found in the embodiment according to FIGS. 5 and 9.

On the side 17 opposite the slit 11, the sleeve 9 carries a nose or projection 18 protruding downwardly past the lower edge 14, as seen in FIG. 2. This nose or projection constitutes a guide element preventing rotation of the sleeve around its longitudinal axis M (FIG. 2).

A tool bit holder 19 has a threaded hole 21 extending perpendicularly to its mounting surface 20. A cylindrical radial enlargement 23 of the threaded hole extends between the upper end 22 of the threads and the top side 20 of the tool bit holder. This enlargement forms a shoulder or step 24. A groove 25 extends longitudinally from the enlargement 23 and into the threads. The width of the groove 25 is chosen so that the nose or projection 18 is able to fit therein.

As seen in FIG. 10, the tool bit holder 19 has a recess 26, defined by two lateral limiting walls 27, 28 including an angle α among themselves. The apex 29 formed by the two lateral walls 27, 28 is oriented relative to the hole 21 such that an imaginary connecting line 31 extending between the apex 29 and the longitudinal axis 30 of the hole bisects the angle α. This connecting line 31 also bisects the groove 25.

FIG. 4 shows the position of the individual parts described hereinabove on the tool bit holder 19. Herein, the lockscrew 1 is screwed with its thread 3 into the thread of the bore 21, and the sleeve 9 encompasses the shank 2 of the lockscrew. The nose or projection 18 extends into the groove 25, so that the sleeve 9 is located symmetrically with respect to the connecting line 31.

Figure 7:
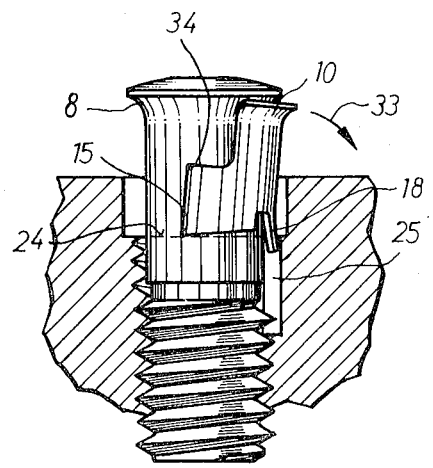

When, as shown in FIGS. 6 and 7, the screw 1 is screwed into the threaded bore 21 (in the direction of arrow 32), with the aid of a suitable tool, the corners 15 on the lower ends of the lateral edges 12, 13 of the sleeve 9 define abutments which come to rest on the shoulder 24. In the course of further screwing-in of the screw 1, as seen in FIG. 7, the conical section 8 of the screw 1 forces, in a wedge-like manner, the outwardly flared rim 10 of the sleeve away from the axis of the screw in the direction of the arrow 33. The sleeve, as the result of the engagement of its lower corners 15 against the shoulder or step 24, performs a tilting motion in that direction 33 about a rotary axis defined by the corners 15 and extending transverse to the axis of the screw 1, whereby the upper ends 34 of the lateral edges 12, 13 of the slit 11, assume the position according to FIG. 7. In the process, the sleeve, which comprises a spring material, undergoes a slight bending apart of the ends 34.

As noted earlier, the sleeve 9 may be provided with an indentation 35 (FIG. 5), i.e., the circumference of the sleeve at its upper end adjacent the screw head is smaller than the circumference of the sleeve at its lower end adjacent the threads. As a result, the upper corner of the lateral edges 12, 13 is located lower than the upper edge 10. As the result, the sleeve 9 requires less bending apart than in the embodiment of FIG. 2.

During the rotating motion of the screw 6, 7, the sleeve remains in its predetermined position symmetrically to the imaginary connecting line 31 (FIG. 10), since the nose or projection 18 engages the groove 25. Thus, the sleeve remains displaceable and tiltable.

Figure 8:
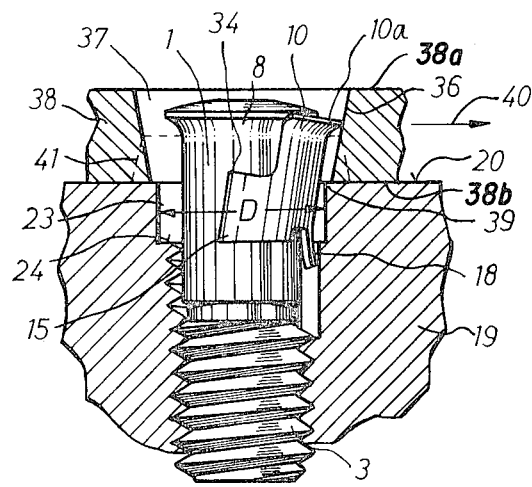

In the terminal position according to FIG. 8, the upper rim 10 of the sleeve has been displaced into firm engagement with the preferably inclined wall 36 of the bore 37 of the tool bit 38. This results in a linear contact between the outer edge 10a of the rim and the side wall 36 of the bore 37. For this purpose, the diameter D of the enlargement 23 of the tool bit holder 19 is chosen so that its border rim 39 does not contact the sleeve 9. The latter receives its only support with its edges 15 on the shoulder or step 24 and its rim 10 on the lateral wall 36 of the recess 37 of the tool bit.

The bore 36 of the bit 38 extends from an outer surface 38a to an abutment, surface 38b of the bit. The bore 36 has a larger cross-sectional area than the head 5, 8 of the screw 1, so that the bit can be removed from and inserted onto the screw and sleeve even without removing the screw or sleeve. This facilitates reversal and/or replacement of the bit.

As seen in FIG. 8, the sleeve 9 effects not only a radial locking of the tool bit 19 in the direction of the arrow 40 against the lateral walls 27 and 28 of the tool bit recess 26 of the tool bit holder 19 (as also indicated by the arrow 33 in FIG. 7), but also applies a force on the bit directed toward the mounting surface 20 of the tool bit holder 19, becomes particularly effective in an advantageous manner, when as seen in FIG. 8, the tool bit holder has a conical bore 37. In the case of a reversible bit, the simple conical bore 37 becomes a double conical bore, indicated by the broken line 41, so that the tilting effect of the sleeve and thus the pressure of the reversible bit on the top side 20 of the tool bit holder is always present.

The mode of operation of the tool bit mount according to the invention described hereinabove further shows that it is sufficient to rotate the screw 1 by approximately 90° to 180°, to relocate the edge 10a of the sleeve 9 in its initial position or at least in a position wherein the edge 10a of the sleeve 9 releases the walls 36 (or 41). In the course of the insertion of a reversible bit, the double conicity of the reversible bit bore effects the rotation of the sleeve in the position according to FIG. 6.

Although the invention has been described in connection with preferred embodiments thereof, it will be appreciated by those skilled in the art that additions, modifications, substitutions, and deletions may be made, without specifically departing from the spirit and scope of the invention as defined in the appended claims.

What is claimed is:

1. In combination a bit holder, a tool bit, and a mounting means for securing said bit to said bit holder, said bit holder comprising:
   a mounting surface,
   a hole extending into said mounting surface and defining a longitudinal axis, said hole including a shoulder spaced from said mounting surface and a threaded portion, and
   limiting wall means extending transversely relative to said mounting surface,
said tool bit including:
   an abutment surface engaging said mounting surface,
   an outer surface disposed oppositely of said abutment surface, and
   a through-bore extending through said bit from said outer surface to said abutment surface, said through-bore including a side wall having an inwardly extending portion which extends toward a longitudinal axis of said through-bore to define a through-bore cross-section which is smaller than a cross-section of said through-bore at said outer surface of said bit,
said mounting means comprising:
   a screw defining a longitudinal axis and extending through said through-bore, said screw including a threaded end making threaded engagement with said threaded portion of said hole, and a wedge-like contact surface disposed at an end opposite said threaded end, and
   a sleeve mounted on said screw so as to be inclinable relative thereto, said sleeve being split in a direction parallel to a longitudinal axis of said sleeve, said sleeve including first and second longitudinally spaced ends, said second end having first and second parts, an internal portion of said first end being wedgingly engaged by said contact surface and pushed thereby toward said hole to force said first part of said second end longitudinally against said shoulder and force said first end laterally outwardly, said second end including said second part which is spaced from said shoulder when said first part initially engages said shoulder to enable said sleeve to become inclined relative to said screw as said first end is forced laterally outwardly into engagement with said inwardly extending portion of said through-bore to transmit clamping forces thereagainst from said contact surface, said sleeve being inclined relative to said screw such that said longitudinal axis of said sleeve is non-parallel relative to said longitudinal axis of said screw to force said bit in a direction having a lateral component forcing said bit against said limiting wall means and a longitudinal component forcing said bit against said mounting surface,
   the smallest cross-section of said through-bore being larger than the largest cross-section defined by said screw and sleeve when the longitudinal axes of said sleeve and screw are parallel, so that said bit is removable from said mounting means with said screw threadedly secured in a loosened condition within said hole.

2. An assembly according to claim 1, wherein said shoulder lies perpendicular to said longitudinal axis of said screw.

3. An assembly according to claim 1, wherein said sleeve is in non-contacting relationship with all portions of said hole extending between said shoulder said said bit.

4. An assembly according to claim 1, wherein said hole includes a non-threaded portion which is radially enlarged relative to said threaded portion, the junction between said threaded and non-threaded portions defining said shoulder.

5. An assembly according to claim 1, wherein said screw includes a head having a conical surface defining said contact surface.

6. An assembly according to claim 5, wherein said first end of said sleeve being flared in complementary relationship to said conical surface.

7. An assembly according to claim 1, wherein the split portion of said sleeve is cut away adjacent said first end such that the circumference of said first end is smaller than said circumference of said second end.

8. An assembly according to claim 1, wherein said threaded portion of said hole includes a groove extending parallel to said longitudinal axis of said hole, and said sleeve includes a projection disposed in said groove to prevent rotation of said sleeve about said longitudinal axis of said sleeve relative to said hole.

9. An assembly according to claim 1, wherein said inwardly extending portion of said bore side wall is of conical configuration.

10. An assembly according to claim 1, wherein said upper end of said sleeve makes only linear contact with said side wall of said bore.

* * * * *